US009442987B2

(12) United States Patent
Nogues et al.

(10) Patent No.: US 9,442,987 B2
(45) Date of Patent: *Sep. 13, 2016

(54) AUTOMATICALLY GENERATING MUSIC MARKETPLACE EDITORIAL CONTENT

(71) Applicant: MICROSOFT TECHNOLOGY LICENSING, LLC, Redmond, WA (US)

(72) Inventors: Paul Nogues, Paris (FR); Sebastien Leang, Paris (FR); Damien Aroux, Paris (FR); Manuel Millot, Paris (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/462,071

(22) Filed: Aug. 18, 2014

(65) Prior Publication Data

US 2014/0379732 A1    Dec. 25, 2014

Related U.S. Application Data

(63) Continuation of application No. 13/526,566, filed on Jun. 19, 2012, now Pat. No. 8,843,500.

(51) Int. Cl.
*G06F 17/30* (2006.01)
*H04N 21/81* (2011.01)
(Continued)

(52) U.S. Cl.
CPC ..... *G06F 17/3053* (2013.01); *G06F 17/30029* (2013.01); *G06F 17/30035* (2013.01);
(Continued)

(58) Field of Classification Search
CPC ............... G06F 17/30749; G06F 17/3074; G06F 17/30743; G06F 17/30029; G06F 17/30035; G06F 17/30056; G06F 17/30787
See application file for complete search history.

(56) References Cited

U.S. PATENT DOCUMENTS 6,545,209 B1    4/2003  Flannery et al.
7,469,283 B2 *  12/2008 Eyal et al. ............ 709/223
(Continued)

OTHER PUBLICATIONS

Kutzer-Rice, Rebecca, "Algorithm Predicts Music's Popularity", Retrieved at <<http://www.smartertechnology.com/c/a/Optimized-Systems/Algorithm-Predicts-Musics-Popularity/>>, Dec. 29, 2011, pp. 03.

(Continued)

*Primary Examiner* — Le H Luu
(74) *Attorney, Agent, or Firm* — Brian Webster; Judy Yee; Micky Minhas

(57) ABSTRACT

Example apparatus and methods concern automatically creating editorial content for albums that are to be recommended in a computerized music marketplace. An album may be selected for recommendation after analyzing consumption data (e.g., sales, downloads, samples), and popularity data (e.g., chart rankings, critical reviews). The popularity data may also include data mined from sources including search engines and social media sites. An overall recommendation score may be a weighted function of consumption data and popularity data. A customized recommendation score may be a weighted function of the overall recommendation score influenced by regional considerations, demographic considerations, and other considerations. The editorial content may include art and text and may be customized based on regional considerations, demographic considerations, and based on other art or text that will appear at the same time as the editorial content.

14 Claims, 6 Drawing Sheets

(51) Int. Cl.
*H04N 21/25* (2011.01)
*H04N 21/258* (2011.01)

(52) U.S. Cl.
CPC ..... *G06F17/30056* (2013.01); *G06F 17/3074* (2013.01); *G06F 17/30743* (2013.01); *G06F 17/30749* (2013.01); *G06F 17/30769* (2013.01); *G06F 17/30787* (2013.01); *H04N 21/252* (2013.01); *H04N 21/25883* (2013.01); *H04N 21/25891* (2013.01); *H04N 21/8113* (2013.01)

(56) References Cited

U.S. PATENT DOCUMENTS

| | | | |
|---|---|---|---|
| 7,649,134 | B2 | 1/2010 | Kashioka |
| 7,756,915 | B2 | 7/2010 | Ben-Yaacov et al. |
| 2008/0103878 | A1* | 5/2008 | Leach et al. ............. 705/10 |
| 2008/0207137 | A1* | 8/2008 | Maharajh et al. ........ 455/74 |
| 2011/0219419 | A1* | 9/2011 | Reisman ................ 725/112 |
| 2012/0011138 | A1 | 1/2012 | Dunning et al. |
| 2012/0323938 | A1* | 12/2012 | Skeen et al. ............. 707/754 |

OTHER PUBLICATIONS

Casey, et al., "Content-Based Music Information Retrieval: Current Directions and Future Challenges", Retrieved at <<http://ieeexplore.ieee.org/stamp/stamp.jsp?tp=&arnumber=4472077>>, Proceedings of the IEEE, Apr. 4, 2008, pp. 668-696.

Marsden, Alan, "Music Analysis and the Computer", Retrieved at <<http://www.lancs.ac.uk/staff/marsdena/publications/MarsdenForEPrints.pdf>>, 2003, pp. 10.

Kanters, P.W.M., "Automatic Mood Classification for Music", Retrieved at <<http://ilk.uvt.nl/downloads/pub/papers/hait/kanters2009.pdf>>, Jun. 2009, pp. 52.

"Zune Rock", Retrieved at <<http://social.zune.net/music/genre/rock>>, Jun. 13, 2009, pp. 02.

"Billboard.com", Retrieved at <<http://www.billboard.com/#/charts/hot-100>>, Dec. 27, 1996, pp. 03.

"All Music", Retrieved at <<http://allmusic.com/>>, Dec. 20, 1996, pp. 02.

* cited by examiner

AUTOMATICALLY GENERATING MUSIC MARKETPLACE EDITORIAL CONTENT

CROSS-REFERENCE TO RELATED APPLICATIONS

This application is a continuation of Ser. No. 13/526,566 filed Jun. 19, 2012.

BACKGROUND

Editorial content for a music marketplace is typically manually created. A large team of industry-savvy editors are typically fully engaged in an on-going effort to remain current with popular artists, albums, trends, and other aspects of the music industry. While sales data may provide one piece of information about who is a currently popular artist, and which albums are trending up or down, sales data by itself only provides a limited picture. Also, sales data may overlook artists who are about to become popular. For example, the winner of American Idol may have had zero sales but may be on the edge of becoming popular. Sales data alone may overlook this type of data point.

Scaling manually programmed editorial content to multiple genres or regions may require more resources (e.g., time, industry-savvy editors) than are available. Thus, manually producing and providing editorial content in a relevant time frame may be difficult, if even possible at all. Even if enough editors are available, some editors may be biased by personal likes and dislikes, may be inappropriately influenced, or may consider some pieces of data more or less important than other editors. Therefore, editorial content may, at times, appear inconsistent.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods analyze consumption data for albums. Example apparatus and methods may also analyze popularity data for albums. The consumption data and popularity data may be used to compute an overall recommendation score for albums. The overall or generic recommendation score may then be customized for different genres, regions, consumers, and other categories. Example apparatus and methods may selectively provide editorial content for a highly scored album to a music marketplace. The editorial content may include art, text, and other information.

Example apparatus, methods, and computer-readable storage media facilitate selecting an album to be recommended on a computer-based music marketplace. The album may be recommended based on consumption data, popularity data, and social media data. When an album is recommended, example apparatus and methods may automatically generate electronic editorial content for the selected album. In one embodiment, the editorial content may be customized for different regions, genres, demographics, and other categories. Example apparatus and methods may then selectively provide the electronic editorial content to the computer-based music marketplace.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
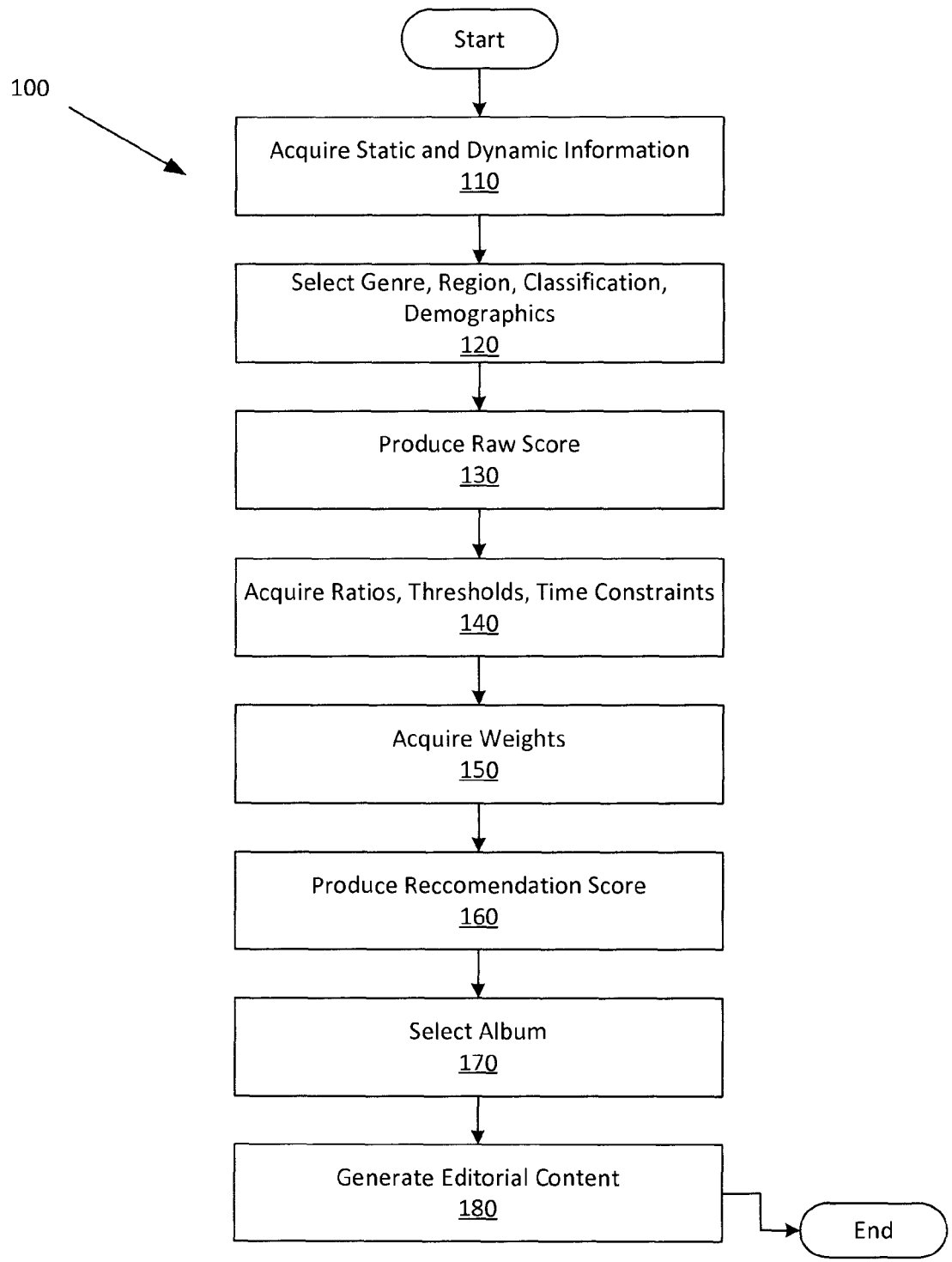
FIG. 1 illustrates an example method associated with automatically generating editorial content for a computerized music marketplace.

Example apparatus and methods automate production of editorial content for a music marketplace. The editorial content may be employed when recommending items for sale in the music marketplace. Content (e.g., an album) may be recommended in an attempt to improve or maximize metrics for the music marketplace. The metrics may include, but are not limited to, sales, profit, traffic, revenue, and unique visits.

In one embodiment, an item (e.g., album) to be highlighted to a consumer visiting the music marketplace can be selected based on a score that considers attributes including, but not limited to, consumption and popularity. Consumption and popularity may be analyzed from global data, regional data, or data from other geographic subdivisions. For example, sales and popularity in some countries (e.g., United States) may be relevant to some other countries (e.g., Canada) while sales and popularity in other countries (e.g., Japan) may be irrelevant to some other countries (e.g., Finland). In one embodiment, popularity may be inferred from data mined from sources including search engines, and social media.

A music marketplace may include different types of recommendations including, for example, recommendations for newly released material, recommendations for currently popular material, and recommendations for classic material. Recommendations may also be made in different genres and for different regions. For example, different recommendations may be made for rock music, for country music, for techno music, for rap music, or for other genres. Similarly, different recommendations may be made in the United States, in France, in Japan, in Ohio, in Michigan, in Cleveland, in Cincinnati, in Corryville, in Western Hills, and in other locations.

In one embodiment, the scoring and recommendations will be performed by a server process that may be accessible to client processes. In one embodiment, scores, recommendations, or editorial content may be pushed to client applications. In another embodiment, client applications may selectively pull scores, recommendations, or editorial content from the server process or repository. In one embodiment, the server process may reside in a dynamic link library (DLL). In different embodiments, applications accessing the scores, recommendations, or editorial content may run on devices including, but not limited to, smart phones, personal music players, tablet devices, laptop computers, desk top computers, and other processing equipment configured to recommend choices or play music.

Different embodiments may aggregate data from a variety of internal or external sources. The data may be used to produce scores reflecting the popularity of artists or albums. The scores may control which albums or artists are highlighted on the music marketplace. The music marketplace may be partially configurable with respect to musical genres, regions, and in other ways. For example, a user may prefer to see selected genres of music (e.g., country, western) from selected artists (e.g., Faith Hill, Taylor Swift). Even though a user may partially customize a marketplace display, additional editorial content may also be displayed.

In one embodiment, a score for an album or artist may depend, at least in part, on a previous score or recommendation. For example, an album that was scored in the top ten of all albums last week may maintain a high enough ranking to be recommended this week even though its discrete data from this week might not qualify the album for a recommendation. Considering previous scores or recommendations facilitates selectively producing turnover in recommendations to facilitate increasing or maximizing metrics. Turnover prevents displaying the same recommendations period after period. If a music marketplace has no turnover, there may be no incentive for a user to re-visit the music marketplace.

Once an artist or album has been selected, example apparatus and methods may automatically provide editorial content for display on the marketplace. To enhance the likelihood that a recommendation may be purchased, the editorial content may be selected based on region, demographic, or other factors. For example, different images of an artist may be available. An image of the artist riding a motorcycle may be used in a first region while an image of the artist walking on the beach may be used in a different region. Similarly, a tag line may be regionalized. Not only will regions use different languages (e.g., English, French), but regions may also have different stock phrases or popular phrases that are unique to a culture. The tag line customization may account for the language and unique usage.

Example apparatus and methods may aggregate data from a variety of sources to account for past, present, and predicted future popularity of an album or artist. In one embodiment, popularity may be a function of data including, but not limited to, consumption, reviews, rankings, searches, site visits, and social media mentions. Consumption data may include sales, downloads, streams, plays, purchases, and other consumptions. The consumption data may be weighted. For example, consumption data may be weighted to make recent consumption more important in a popularity score. The consumption data may also be weighted to make local consumption more important or even determinative. By way of illustration, a certain album may be very popular in one region (e.g., country, state, city, neighborhood, campus) but not very popular elsewhere. Consumption data may be considered at the different regional levels to facilitate tailoring a recommendation based on the regional data. For example, an album may be very popular in one city because a successful local sports team has adopted a song on the album as a theme song. Recommendations to devices located in that city may include the album while recommendations to devices located in a rival city may not include the album. Regional granularity may lead to albums being considered at the national level, state level, city level, neighborhood level, campus level, or other levels. Providing different regional granularity may facilitate more focused recommendations that are more likely to be purchased.

Popularity may also be a function of reviews. For example, the popularity score may depend, at least in part, on the number and quality of reviews received from recognized reviewers. Reviews may also be manipulated to account for regions. For example, a review from a college disk jockey may be considered for a recommendation to a device located on that college campus or on other college campuses, but may not be considered in another city.

Popularity may also be a function of chart rankings. For example, the popularity score may depend, at least in part, on the position of the album in a nationally recognized ranking (e.g., Billboard). Rankings may also be manipulated to account for regions. For example, a ranking on a worldwide chart may contribute to a score for an album in France while a ranking on a Mexican chart may not contribute to the score for the album in France.

Popularity may also be a function of data available from album providers. These album providers may be referred to as "the labels". The labels may include, for example, SONY, Universal, Warner Music, and others. The labels may provide information concerning albums about to be released or promoted. The popularity score may therefore be adjusted based on information from the labels about upcoming releases or promotions. In one embodiment, information from the labels include the "rolling ninety" promotion information that identify albums that may be featured in the near future.

Popularity may also be a function of data mining. Data may be mined from sources including, but not limited to, search engines, social media sites, website visit counters, and other marketplaces. By way of illustration, the popularity score may depend on how many searches have been made for the album title in a search engine. Similarly, a popularity score may depend on how many mentions have been made of the album on Facebook or Twitter. Additionally, a popularity score may depend on how many times an album's website has been visited, or on how many links flow into the album's website. The mined data may be considered in discrete form (e.g., how many hits today), may be considered in trend form (e.g., hits are increasing), may be considered in relative form (e.g., how many hits compared to a known popular album), or may be considered in other ways.

In different embodiments, popularity may be analyzed for different periods of time including previous time periods, current time periods, and future time periods. Different periods may be weighted differently. In one embodiment, how different periods are weighted may be configurable. In one embodiment, how different periods are weighted may even be user configurable.

The popularity score may be computed using a weighted combination of attributes. The recommendation score may also be affected by time constraints, thresholds, ratios, and other modifiers. The time constraints, thresholds, ratios, and other modifiers may depend, at least in part, on metadata that carries information about an album.

Whether an album is even considered for being recommended may depend on metadata associated with the album. Metadata may describe features including a genre for an album, an artist for the album, the length of an album, or other attributes. Thus, an album whose metadata identifies the album as a rock album will not be considered when making a recommendation for a country album. Similarly, a release whose metadata identifies it as a single will not be considered for making a recommendation concerning a full length album. The length of a release may be classified by metadata associated with the release according to, for example, an album having 8+ tracks, an extended play (EP) having 4-8 tracks, and a single having a single track. An album's metadata may also identify a release date. The release date may control, for example, whether an album is considered for a new-release recommendation or for a rewind (e.g., classic) recommendation. The metadata may also describe an album genre (e.g., rock, country, rap). The metadata may also describe the language in which the artist is singing (e.g., French, English) or even whether there are any lyrics (e.g., instrumental). Metadata can also describe the artist, not just the album. For example, the metadata may identify the number of hits an artist has had in different countries, the typical genre for the artist, a demographic to which the artist appeals, and other information.

The recommendation score may also be influenced by ratios. For example, the marketplace may seek to recommend albums according to a ratio that balances international appeal against local appeal. Similarly, the marketplace may seek to recommend albums according to a ratio that is consistent with the labels' market share. For example, a marketplace may not want to recommend albums from only one label and ignore all other labels. Once again, the ratios may also be manipulated regionally, by genre, or by demographic. For example, the distribution of market share between labels for purchases made by males over forty in Ohio may be different than the distribution between labels for purchases made by females under sixteen in California. Thus, when demographic information for a client is available, recommendations may be tailored based on that information. The recommendation score may be influenced by a ratio that identifies regional listening trends. For example, Japanese consumers may listen to 95% Japanese content and only 5% international content while French consumers may listen to 50% French content and 50% international content. Therefore, to positively influence marketplace metrics, recommendations may be tailored to reflect the regional listening trends. Additional ratios that may be considered include, but are not limited to, the number of male and female artists recommended, the number of solo artists and groups recommended, and the number of artists over the age of twenty that are recommended.

A recommendation score may also be influenced by a threshold. Thresholds may be configured to control, for example, how many times in a row an album may be recommended, how many times in a row an album may be the most highly recommended album, how many albums by the same artist are recommended, how many albums in the same genre are recommended, and other factors. Improving or maximizing a marketplace metric may depend, at least in part, on producing some turnover between recommendations. Therefore, a threshold may be configured to force the marketplace to make different recommendations at different times.

In one embodiment, the recommendation score may be computed using a weighted function. In one embodiment, a user may be able to partially configure the weights for some recommendations. Allowing personal customization may increase the likelihood that a user will visit the marketplace and thus may facilitate improving or maximizing a metric for the marketplace.

In one embodiment, the recommendation scores may be computed periodically (e.g., daily, weekly, monthly). The period may, in one example, be configurable. In another embodiment, the recommendation scores may be computed in real time or substantially in real time.

In one embodiment, the scoring process or processes may be self-aware concerning previous recommendations. For example, the scoring process(es) may persist information about recommendations previously made. Then, the scoring process(es) may access information about performance (e.g., sales) following the recommendation. A future score and recommendation may then depend, at least in part, on performance following the recommendation. For example, if an album experienced a 10% increase in sales following the recommendation, then the increase may positively impact whether the recommendation will be repeated. But if the album experienced a 10% decrease in sales following the recommendation, then the decrease may negatively impact whether the recommendation will be repeated.

After scores have been computed, and after recommendations have been decided upon, editorial content will be generated and made available to or displayed in the marketplace. The editorial content may include an album identifier (e.g., cover art), an artist identifier (e.g., photograph), a tagline (e.g., "check out Blue's latest hit"), and other information.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

FIG. 1 illustrates an example method 100 associated with automatically generating editorial content for a computerized music marketplace. Method 100 may include, at 110, controlling an automated album scoring process to acquire static information for a set of albums and to acquire dynamic information for the set of albums. The static information is information that is unlikely to change (e.g., artist name) while the dynamic information is information that is likely to change (e.g., ranking). In one embodiment, the static information may include, but is not limited to, an artist name for an album, a genre for an album, a release date for an album, a length of an album, a language for the lyrics on an album, a piece of cover art for an album, and artist art for an album. In one embodiment, the dynamic information may include, but is not limited to, a consumption data for an album, a review for an album, a ranking for an album, a search-based popularity indicia for an album, a web-site traffic-based popularity indicia for an album, a social media-based popularity indicia for an album, a previous popularity score for an album, and information provided by the a distributor of an album.

Method 100 may also include, at 120, controlling the automated album scoring process to select a genre for which an album recommendation is to be made, to select a region for which the album recommendation is to be made, to select a classification for which the album recommendation is to be made, and to select a demographic for which the album recommendation is to be made. In one embodiment, the genre partitions the music marketplace by music type, the region partitions the music marketplace geographically, and the classification partitions the music marketplace by release date. While genre, region, and classification divide the marketplace, the demographic may partition purchasers. Purchasers may be divided by identifiable criteria including, but not limited to, age, sex, and location.

Method 100 may also include, at 130, controlling the automated album scoring process to produce a raw score for a member of the set of albums as a function of the static information, the dynamic information, the genre, the region, the classification, and the demographic. The raw score may then be manipulated to account for other factors (e.g., timeliness, relationships with other recommendations). In one embodiment, the raw score may be an intermediate result in a larger calculation of, for example, a recommendation score.

Method 100 may also include, at 140, controlling an automated recommendation process to acquire a set of ratios associated with recommendations in a music marketplace, to acquire a set of thresholds associated with recommendations in the music marketplace, and to acquire a set of time constraints associated with recommendations in the music marketplace, where the set of ratios, set of thresholds, and set of time constraints control, at least in part, whether an album will be recommended in the music marketplace.

In one embodiment, the set of ratios limit recommendations based on a relationship between a first potential recommendation and one or more second potential recommendations. For example, a ratio may control set membership based on factors including, but not limited to, how many albums are recommended from one region versus other regions, how many albums are recommended from one label versus other labels, how many albums are recommended from male artists versus female artists, how many albums are recommended from young artists versus old artists, how many albums are recommended from established artists versus new artists, and how many albums from groups are recommended versus albums from individual artists.

In one embodiment, the set of thresholds also limit recommendations. Recommendations may be limited based on factors including, but not limited to, the number of times the album has been recommended previously, the number of consecutive times the album has been recommended, and the number of albums by an artist that are currently recommended. For example, rather than recommending the same album over and over, replacing an album after it reaches a threshold number of presentations may allow a marketplace metric to improve because there are new choices for a visitor to the music marketplace. There may be little difference between the third, fourth, and fifth place recommendations available. Therefore, in one embodiment, the set of thresholds may control how frequently an album is recommended when the album's score is only marginally better than the next possible album(s) that could be recommended.

In one embodiment, the set of time constraints may limit recommendations based, at least in part, on release date. For example, to qualify as a new release, an album may have to have been released within a certain number of days of the recommendation date. Similarly, to be considered for a recommendation as a "rewind", an album may need to have been released more than a certain number of years before the recommendation date. Additionally, information about when a label or other entity will be promoting an album may be considered as a time constraint. For example, information that the title track from an album will be the theme music for a movie being released on July $4^{th}$ may be considered during the week before and the two weeks after July $4^{th}$. Similarly, information that a band will have a tour stop in a certain city on a certain date may be considered when recommending into the market in which the tour stop will occur.

Method 100 may also include, at 150, controlling the automated recommendation process to acquire a set of weights that control, at least in part, the relative importance to a recommendation score of one or more of, the genre, the region, the classification, the demographic, the set of ratios, the set of thresholds, and the set of time constraints. For example, in one market (e.g., United States), demographics may be a better predictor of sales than classification while in another market (e.g., Japan), region and genre may be more important than other factors. Therefore, in one embodiment, the weights may be configurable, and may even be user configurable.

Method 100 may also include, at 160, controlling the automated recommendation process to produce the recommendation score for the member of the set of albums as a function of the raw score, the set of ratios, the set of thresholds, the set of time constraints, and the set of weights. While method 100 illustrates producing two scores: the raw score and the recommendation score, in one embodiment, only a single score may be produced by a combined function.

Method 100 may also include, at 170, selecting the member of the set of albums as a recommended album based, at least in part, on the recommendation score. For example, the album with the highest overall score may be selected as the number one overall recommendation while albums having the highest scores by region or by genre may be selected as regional or genre-specific recommendations.

Method 100 may also include, at 180, automatically generating editorial content for the music marketplace for the recommended album. The editorial content may include, for example, cover art, artist art, and customized text. The customized text may be customized as a function of factors including, but not limited to, the static information (e.g., artist name, lyric language), the dynamic information (current sales rank, current search engine relevance rank), the genre (e.g., rock albums get all CAPS, country albums get normal capitalization), the region (e.g., United States gets English text, France gets French text), the classification, and the demographic (e.g., older audience gets more mature tag line, younger audience gets more innocent tag line).

The automated scoring process and the automated recommendation process may reside in different locations. In one embodiment, the automated scoring process and the automated recommendation process may be controlled to reside on a server. Once the editorial content is prepared, the editorial content may be made available to a client using a push model, a pull model, or other models.

In one embodiment, the automated recommendation process may produce the recommendation score as a function of a previous recommendation score. For example, fifty percent of a previous score may be added to fifty percent of a current score to produce a blended score. This may facilitate preventing an album from moving too quickly in or out of a recommendation range. Similarly, the automated album scoring process may produce the raw score as a function of a previous raw score.

In one embodiment, the scoring process(es) may produce a score(s) as a function of a change in consumption or a change in popularity attributed to a previous recommendation. For example, if a previous recommendation lead to increased sales, then the recommendation may be repeated. However, if a previous recommendation had no effect, then the recommendation may be dropped.

While FIG. 1 illustrates various actions occurring in serial, it is to be appreciated that various actions illustrated in FIG. 1 could occur substantially in parallel. By way of illustration, a first process could generate a raw score, a second process could generate a recommendation score, and a third process could generate editorial content. While three processes are described, it is to be appreciated that a greater or lesser number of processes could be employed and that lightweight processes, regular processes, threads, and other approaches could be employed. For example, a single process could produce both the raw score and the recommendation score.

Figure 2:
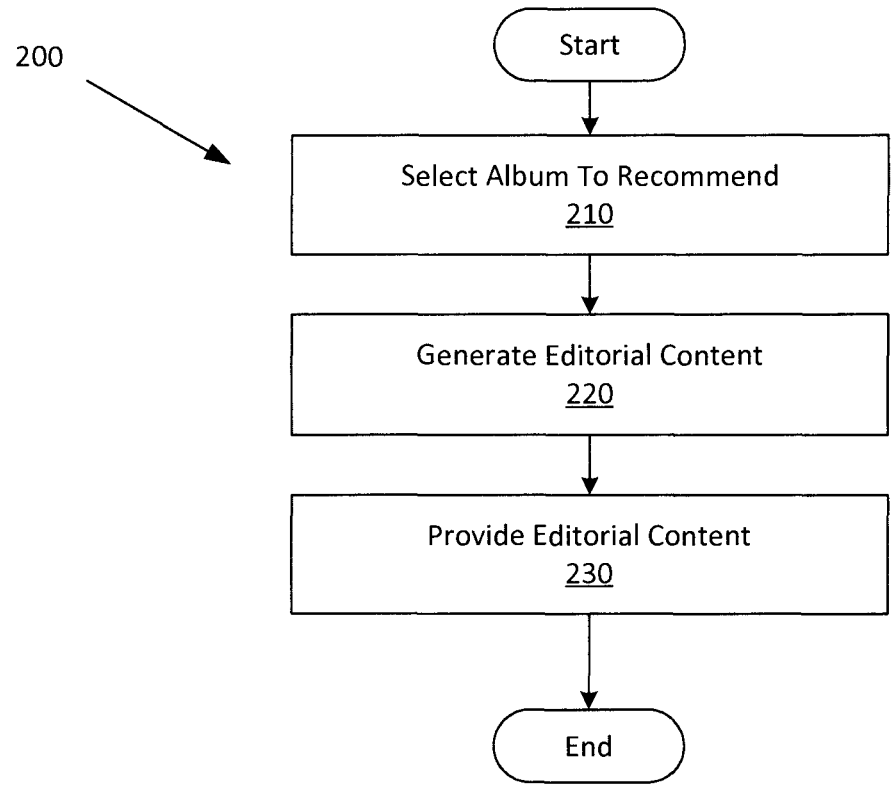
FIG. 2 illustrates an example method associated with automatically generating editorial content for a computerized music marketplace.

FIG. 2 illustrates an example method 200 associated with automatically generating editorial content for a computerized music marketplace. Method 200 may include, at 210, selecting an album to be recommended on a computer-based music marketplace based on consumption data and popularity data.

Method 200 may also include, at 220, automatically generating electronic editorial content for the selected album. The editorial content may be customized, for example, by region, genre, or in other ways.

Method 200 may also include, at 230, selectively providing the electronic editorial content to the computer-based music marketplace.

In one example, a method may be implemented as computer executable instructions. Thus, in one example, a computer-readable storage medium may store computer executable instructions that if executed by a machine (e.g., computer) cause the machine to perform methods described herein including method 100 or method 200. While executable instructions associated with the above methods are described as being stored on a computer-readable storage medium, it is to be appreciated that executable instructions associated with other example methods described herein may also be stored on a computer-readable storage medium.

Figure 3:
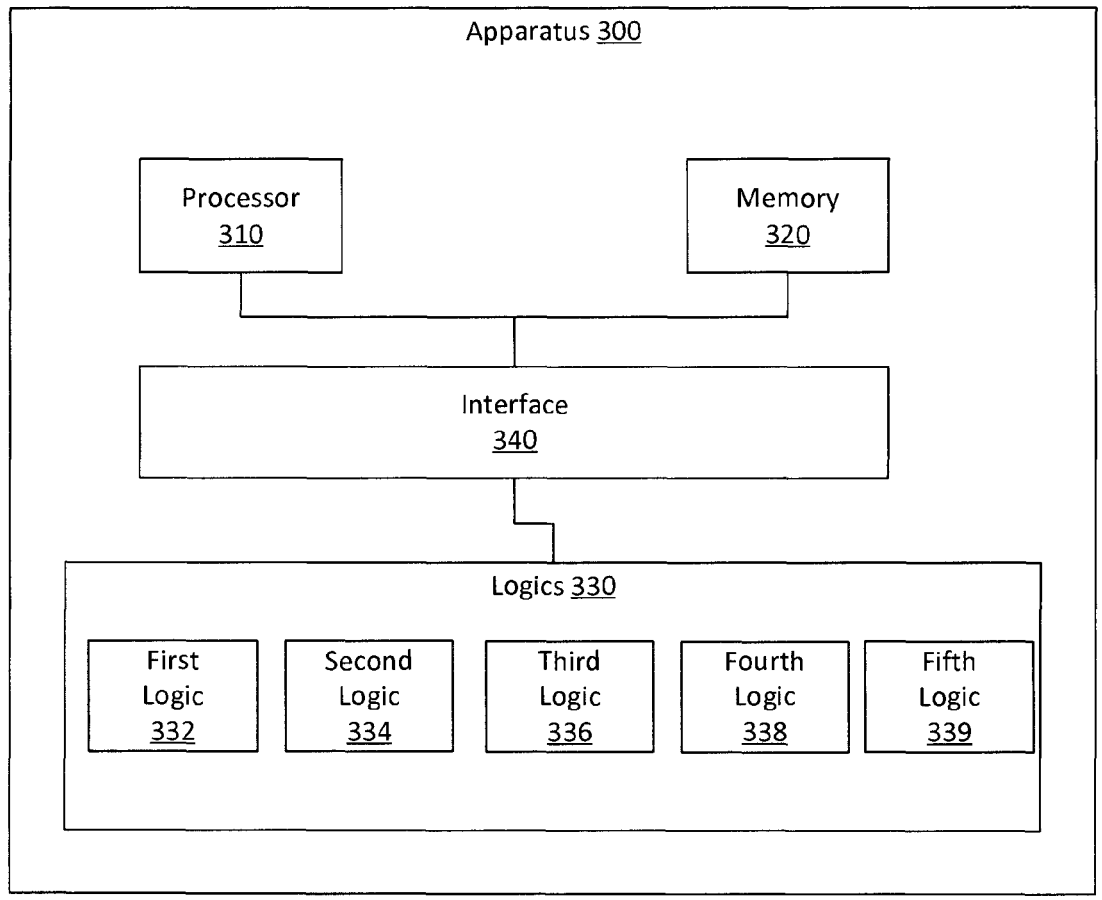
FIG. 3 illustrates an example apparatus associated with automatically generating editorial content for a computerized music marketplace.

FIG. 3 illustrates an apparatus 300 that includes a processor 310, a memory 320, a set 330 of logics and an interface 340 that connects the processor 310, the memory 320, and the set 330 of logics. In one embodiment the apparatus 300 may be a general purpose computer that has been transformed into a special purpose computer through the inclusion of the set 330 of logics. The set 330 of logics may be configured to facilitate automated production of editorial content for an album to be recommended to a music marketplace. In one embodiment, the methods described herein may be performed by apparatus 300. Apparatus 300 may interact with other apparatus, processes, and services through, for example, a computer network.

The set 330 of logics may include a first logic 332 that is configured to analyze consumption data for an album. In one embodiment, the first logic 332 may be configured to analyze consumption data including, but not limited to, data describing a number of sales, data describing a number of downloads, data describing a number of samples, data describing a number of streams, and data describing a number of plays. The data may be analyzed for different time periods. The data may be analyzed for its discrete value, for a trend in the data, based on its relation to other data, and in other ways. Analyzing the consumption data may include ranking albums to be considered for a recommendation based on their consumption.

The set 330 of logics may also include a second logic 334 that is configured to analyze popularity data for the album. In one embodiment, the second logic 334 may be configured to analyze popularity data including, but not limited to, data describing a chart ranking, data describing a critical review, data describing search engine relevance, data describing social media relevance, and data describing promotion data. Once again, the data may be analyzed for its discrete value, for a trend in the data, based on its relation to other data, and in other ways. Analyzing the popularity data may include ranking albums to be considered for a recommendation based on their popularity.

The set 330 of logics may also include a third logic 336 that is configured to produce an overall recommendation score for the album. The third logic 336 may be configured to produce the overall recommendation score as a function of the consumption data and popularity data. For example, the consumption data may identify albums that are selling well while the popularity data may identify albums that are being talked about on social media. The combination may lead to a recommendation that is more powerful than either measure in isolation.

The set 330 of logics may also include a fourth logic 338 that is configured to produce a customized recommendation score for the album. In one embodiment, the fourth logic 338 may be configured to produce the customized recommendation score as a function of the overall recommendation score as influenced by one or more of, a regional consideration, a demographic consideration, and a consideration of membership in a set of recommended albums. The filtering may address issues including, for example, having a distribution of albums that does not agree with the labels' respective market shares, having too many albums from the same artist, having too many albums with the same release date, and other issues. In one embodiment, the third logic 336 and the fourth logic 338 may be a single logic and there may only be a customized recommendation score with no overall recommendation score separately available.

The set 330 of logics may also include a fifth logic 339 that is configured to selectively provide editorial content for the album to a music marketplace. The editorial content may include, for example, art and text. In one embodiment, the fifth logic 339 may be configured to provide the editorial content to a music marketplace in a customized form. The customized form may depend, at least in part, on regional considerations (e.g., language), demographic considerations (e.g., expected reading level), and the membership in a set of recommended albums.

Figure 4:
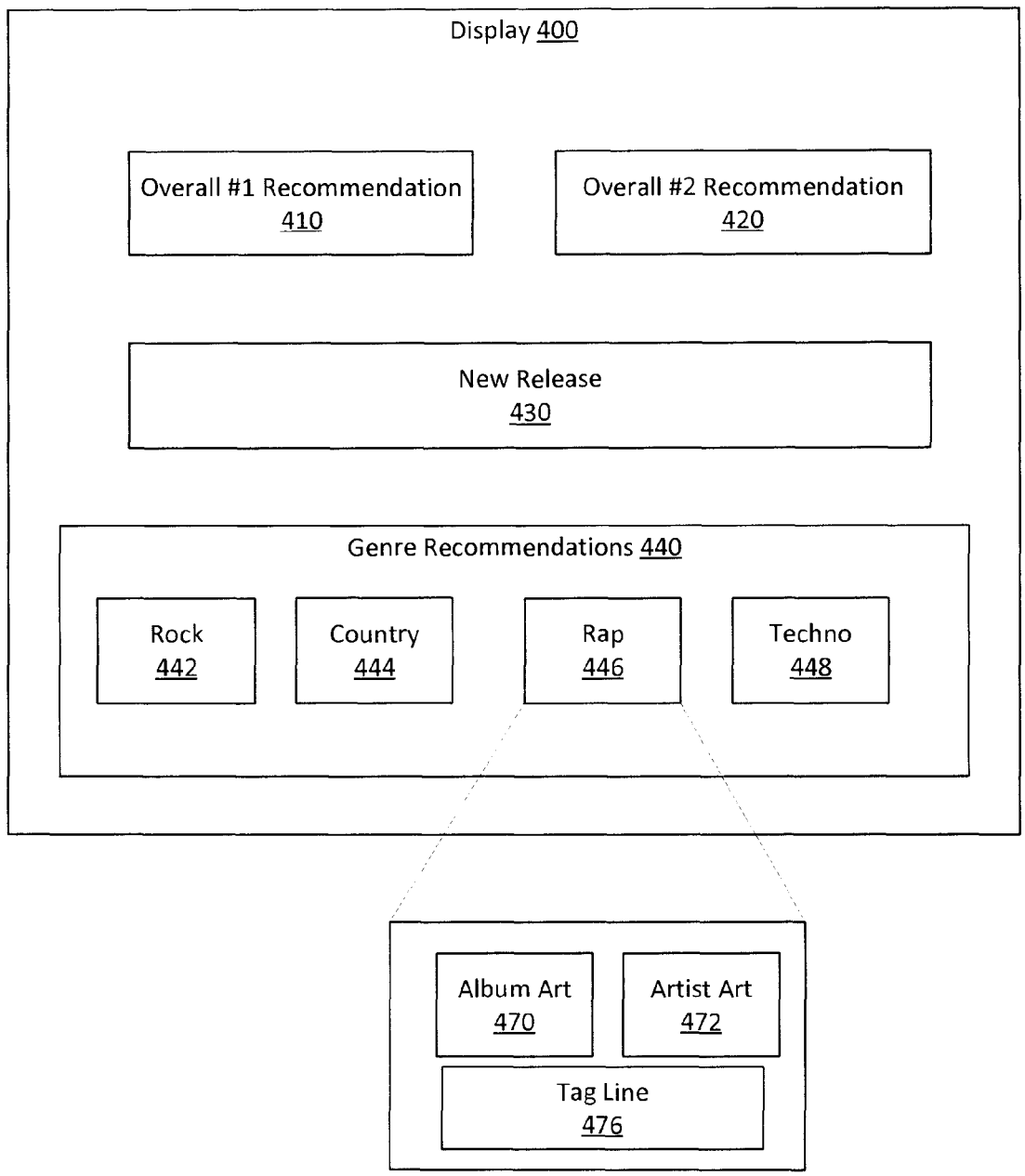
FIG. 4 illustrates an example screen shot of automatically generated editorial content for a computerized music marketplace.

FIG. 4 illustrates an example display 400 that may appear on a computerized music marketplace. Display 400 includes several different recommendations. For example, display 400 includes an overall #1 recommendation 410 and an overall #2 recommendation 420. These two recommendations may concern a large region, a number of genres, and a number of demographics. Display 400 may also include a new release recommendation 430. The new release recommendation 430 may be limited to albums that are less than seven days old. The display 400 may also include a number of genre recommendations 440. For example, display 400 may include a rock recommendation 442, a country recommendation 444, a rap recommendation 446, and a techno recommendation 448. While four genres are illustrated, a greater or lesser number of genres may be displayed.

FIG. 4 also illustrates additional detail for the rap recommendation 446. This additional detail represents the editorial content automatically generated by example methods and apparatus described herein. The additional detail is more generally applicable to other recommendations on display 400 as well. The additional detail includes an illustration of album art 470, artist art 472, and a tag line 476. While two pieces of art and a single text line are illustrated, different numbers and types of editorial content may be displayed for a recommendation.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

Figure 5:
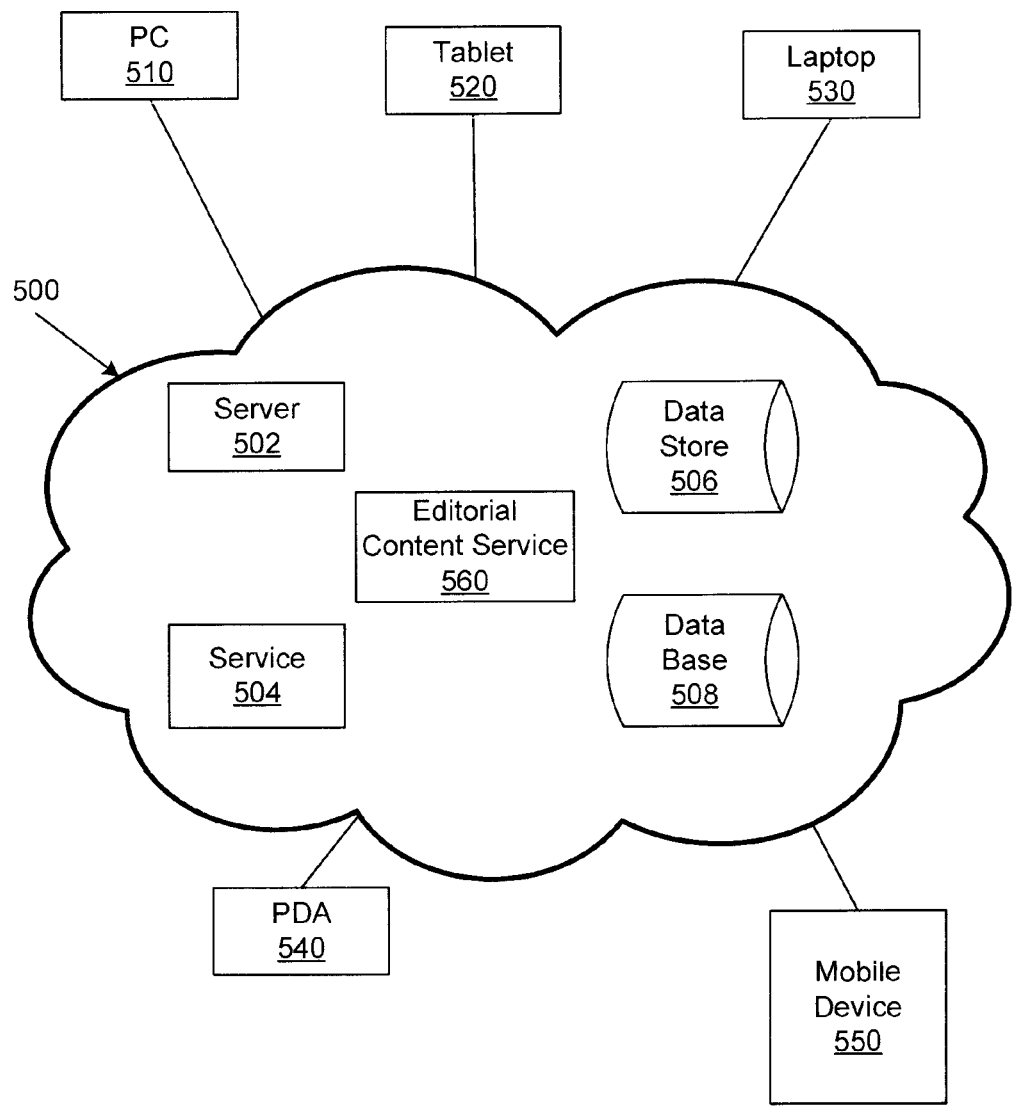
FIG. 5 illustrates an example cloud operating environment.

FIG. 5 illustrates an example cloud operating environment 500. A cloud operating environment 500 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices, over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 5 illustrates an example editorial content service 560 residing in the cloud 500. The editorial content service 560 may rely on a server 502 or service 504 to perform processing and may rely on a data store 506 or database 508 to store data. While a single server 502, a single service 504, a single data store 506, and a single database 508 are illustrated, multiple instances of servers, services, data stores, and databases may reside in cloud 500 and may, therefore, be used by the editorial content service 560.

FIG. 5 illustrates various devices accessing the editorial content service 560 in the cloud 500. The devices include a computer 510, a tablet 520, a laptop computer 530, a personal digital assistant 540, and a mobile device (e.g., cellular phone, satellite phone) 550. The editorial content service 560 facilitates automatically generating editorial content for an album to be recommended in a music marketplace. Thus, it is possible that different users at different locations using different devices may access the editorial content service 560 through different networks or interfaces. In one example, the editorial content service 560 may be accessed by a mobile device 550. In another example, portions of editorial content service 560 may reside on a mobile device 550.

Figure 6:
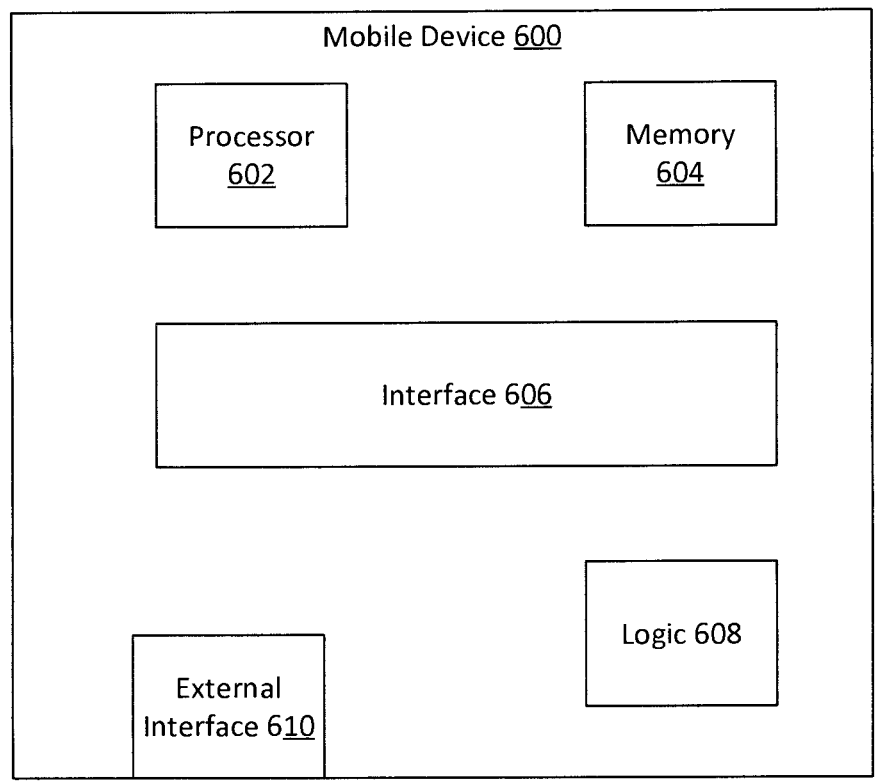
FIG. 6 illustrates an example mobile device.

FIG. 6 illustrates an example mobile device 600. Mobile device 600 includes a processor 602, a memory 604, a logic 608, and an external interface 610 that may be connected by an interface 606. Mobile device 600 may be, for example, a cellular telephone, a network telephone, a satellite telephone, or other device.

Generally describing an example configuration of the mobile device 600, the processor 602 may be a variety of various processors including dual microprocessor and other multi-processor architectures. The memory 604 may include volatile memory or non-volatile memory. Non-volatile memory may include, for example, read only memory (ROM), programmable ROM (PROM), and other memory. Volatile memory may include, for example, random access memory (RAM), dynamic RAM (DRAM), and other memory. The memory 604 can store an operating system that controls and allocates resources of the mobile device 600.

The interface 606 may be a single internal bus interconnect architecture or other bus or mesh architectures. While a single bus is illustrated, it is to be appreciated that the mobile device 600 may communicate with various devices, logics, and peripherals using other busses (e.g., PCIE, 1394, USB, Ethernet). The interface 606 can be types including, for example, a memory bus, a memory controller, a peripheral bus, an external bus, a crossbar switch, or a local bus.

The mobile device 600 can operate in a network environment and thus may be connected to a network through network devices via the external interfaces 610. The mobile device 600 may be logically connected to remote computers through the network and the network devices. Through the network, the mobile device 600 may also be connected to services provided in the cloud (e.g., cloud 500, FIG. 5). Networks with which the mobile device 600 may interact include, but are not limited to, a local area network (LAN), a wide area network (WAN), a telephony network, a telephony system, a cellular system, a satellite system, and other networks.

Mobile device 600 may include a special purpose logic 608 that is configured to provide a functionality for the mobile device 600. For example, logic 608 may provide a client for interacting with an editorial content service (e.g., service 560, FIG. 5).

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, or ABC (e.g., the data store may store only A, only B, only C, A&B, A&C, B&C, or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    controlling an automated album scoring process to acquire static information for a set of albums and to acquire dynamic information for the set of albums;
    controlling the automated album scoring process to select a genre for which an album recommendation is to be made, to select a region for which the album recommendation is to be made, and to select a demographic for which the album recommendation is to be made;
    controlling the automated album scoring process to produce a raw score for a member of the set of albums as a function of the static information, the dynamic information, the genre, the region, and the demographic;
    controlling an automated recommendation process to acquire a set of thresholds associated with recommendations in the music marketplace, and to acquire a set of time constraints associated with recommendations in the music marketplace, where the set of ratios, set of thresholds, and set of time constraints control, at least in part, whether an album will be recommended in the music marketplace;
    controlling the automated recommendation process to acquire a set of weights that control, at least in part, the relative importance to a recommendation score of the genre, the region, the demographic, members of the set of thresholds, or members of the set of time constraints;
    controlling the automated recommendation process to produce the recommendation score for the member of the set of albums as a function of the raw score, the set of thresholds, the set of time constraints, and the set of weights;
    selecting the member of the set of albums as a recommended album based, at least in part, on the recommendation score, and
    automatically generating editorial content for the music marketplace for the recommended album.

2. The method of claim 1, where the static information includes an artist name for an album, a genre for an album, a release date for an album, a length of an album, a language for the lyrics on an album, cover art for an album, or artist art for an album.

3. The method of claim 1, where the dynamic information includes a consumption data for an album, a review for an album, a ranking for an album, a search-based popularity indicia for an album, a web-site traffic-based popularity indicia for an album, a social media-based popularity indicia for an album, a previous popularity score for an album, or information provided by a distributor of an album.

4. The method of claim 3, comprising controlling the automated recommendation process to produce the recommendation score as a function of a previous recommendation score.

5. The method of claim 4, comprising controlling the automated recommendation process to produce the recommendation score as a function of a change in consumption or a change in popularity attributed to a previous recommendation score.

6. The method of claim 1, where the genre partitions the music marketplace by music type, where the region geographically partitions the music marketplace, where the classification partitions the music marketplace by release date, and where the demographic partitions purchasers by identifiable criteria including age, sex, or location.

7. The method of claim 1, where the set of thresholds limit recommendations based on the number of times the album has been recommended previously, the number of consecutive times the album has been recommended, or the number of albums by an artist that are currently recommended.

8. The method of claim 1, where the set of time constraints limit recommendations based, at least in part, on a release date associated with an album.

9. The method of claim 1, where the set of weights control the relative importance of the genre, the region, the classification, the demographic, the set of ratios, the set of thresholds, or the set of time constraints.

10. The method of claim 1, where the editorial content comprises cover art, artist art, and customized text, and where the customized text is customized as a function of the static information, the dynamic information, the genre, the region, the classification, or the demographic.

11. The method of claim 1, comprising:
controlling the automated scoring process and the automated recommendation process to reside on a server, and
making the editorial content available to a client.

12. The method of claim 1, where the set of weights are user configurable.

13. An apparatus, comprising:
a processor;
a memory;
a set of logics that facilitate automated production of editorial content for an album to be recommended to a music marketplace; and
an interface that connects the processor, the memory, and the set of logics,
the set of logics comprising:
a first logic that analyzes consumption data for the album, the consumption data including data describing a number of sales, data describing a number of downloads, data describing a number of samples, data describing a number of streams, or data describing a number of plays;
a second logic that analyzes popularity data for the album, the popularity data including data describing search engine relevance, and data describing social media relevance;
a third logic that produces an overall recommendation score for the album as a function of the consumption data;
a fourth logic that produces a customized recommendation score for the album; and
a fifth logic that selectively provides editorial content for the album to a music marketplace, where the editorial content includes art and text,
where the fourth logic produces the customized recommendation score as a function of the overall recommendation score as influenced by a demographic consideration and the popularity data.

14. An apparatus, comprising:
a processor;
a memory;
a set of logics that facilitate automated production of editorial content for an album to be recommended to a music marketplace; and
an interface that connects the processor, the memory, and the set of logics,
the set of logics comprising:
a first logic that analyzes consumption data for the album, the consumption data including data describing a number of sales, data describing a number of downloads, data describing a number of samples, data describing a number of streams, or data describing a number of plays;
a second logic that analyzes popularity data for the album, the popularity data including data describing search engine relevance, and data describing social media relevance;
a third logic that produces an overall recommendation score for the album as a function of the consumption data;
a fourth logic that produces a customized recommendation score for the album; and
a fifth logic that selectively provides editorial content for the album to a music marketplace, where the editorial content includes art and text,
where the fourth logic produces the customized recommendation score as a function of the overall recommendation score as influenced by a demographic consideration and the popularity score; and
where the fifth logic provides the editorial content to a music marketplace in a customized form, where the customized form depends, at least in part, on the regional consideration, the demographic consideration, and the membership in a set of recommended albums.

* * * * *